United States Patent
Kamiyama et al.

(10) Patent No.: US 11,495,245 B2
(45) Date of Patent: Nov. 8, 2022

(54) URGENCY LEVEL ESTIMATION APPARATUS, URGENCY LEVEL ESTIMATION METHOD, AND PROGRAM

(71) Applicant: NIPPON TELEGRAPH AND TELEPHONE CORPORATION, Chiyoda-ku (JP)

(72) Inventors: Hosana Kamiyama, Yokosuka (JP); Satoshi Kobashikawa, Yokosuka (JP); Atsushi Ando, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 243 days.

(21) Appl. No.: 16/765,546

(22) PCT Filed: Nov. 15, 2018

(86) PCT No.: PCT/JP2018/042323
§ 371 (c)(1),
(2) Date: May 20, 2020

(87) PCT Pub. No.: WO2019/107170
PCT Pub. Date: Jun. 6, 2019

(65) Prior Publication Data
US 2020/0312352 A1    Oct. 1, 2020

(30) Foreign Application Priority Data
Nov. 29, 2017  (JP) .............................. JP2017-229013

(51) Int. Cl.
*G10L 25/63*        (2013.01)
*G06N 20/00*        (2019.01)
(Continued)

(52) U.S. Cl.
CPC .............. *G10L 25/63* (2013.01); *G06F 17/18* (2013.01); *G06N 20/00* (2019.01); *G10L 15/02* (2013.01); *G10L 15/04* (2013.01); *G10L 25/90* (2013.01)

(58) Field of Classification Search
CPC ...... G06F 17/18; G06N 20/00; G06N 3/0445; G06N 3/08; G06N 5/003; G06N 7/005; G06N 20/10; G06N 20/20; G10L 2015/025
See application file for complete search history.

(56) References Cited

U.S. PATENT DOCUMENTS

| | | | |
|---|---|---|---|
| 7,957,959 B2 * | 6/2011 | Han ........................ | G10L 25/90 704/209 |
| 9,020,822 B2 * | 4/2015 | Kalinli-Akbacak .... | G10L 25/63 704/270 |

(Continued)

FOREIGN PATENT DOCUMENTS

| | | | | |
|---|---|---|---|---|
| JP | 5-119792 A | | 5/1993 | |
| JP | H05119792 A | * | 5/1993 | ............. G10L 15/00 |

(Continued)

OTHER PUBLICATIONS

International Search Report dated Jan. 29, 2019 in PCT/JP2018/042323 filed Nov. 15, 2018, 2 pages.

(Continued)

*Primary Examiner* — Jesse S Pullias
(74) *Attorney, Agent, or Firm* — Oblon, McClelland, Maier & Neustadt, L.L.P.

(57) ABSTRACT

An urgency level estimation technique of estimating an urgency level of a speaker for free uttered speech, which does not require a specific word, is provided. An urgency level estimation apparatus includes a feature amount extracting part configured to extract a feature amount of an utterance from uttered speech, and an urgency level estimating part configured to estimate an urgency level of a speaker of (Continued)

the uttered speech from the feature amount based on a relationship between a feature amount extracted from uttered speech and an urgency level of a speaker of the uttered speech, the relationship being determined in advance, and the feature amount includes at least one of a feature indicating speaking speed of the uttered speech, a feature indicating voice pitch of the uttered speech and a feature indicating a power level of the uttered speech.

12 Claims, 14 Drawing Sheets

(51) Int. Cl.
*G06F 17/18* (2006.01)
*G10L 15/02* (2006.01)
*G10L 15/04* (2013.01)
*G10L 25/90* (2013.01)

(56) References Cited

U.S. PATENT DOCUMENTS

| | | | |
|---|---|---|---|
| 2003/0033145 A1* | 2/2003 | Petrushin | G10L 17/26 704/236 |
| 2008/0059158 A1 | 3/2008 | Matsuo et al. | |
| 2009/0006085 A1* | 1/2009 | Horvitz | G10L 15/26 704/223 |
| 2012/0166195 A1 | 6/2012 | Hayakawa et al. | |
| 2016/0104486 A1* | 4/2016 | Penilla | G10L 15/02 704/232 |
| 2017/0084295 A1* | 3/2017 | Tsiartas | G10L 17/08 |

FOREIGN PATENT DOCUMENTS

| | | |
|---|---|---|
| JP | 2006-106711 A | 4/2006 |
| JP | 2007-286377 A | 11/2007 |
| JP | 2009-282824 A | 12/2009 |
| JP | 2012-137680 A | 7/2012 |
| JP | 2016-76788 A | 5/2016 |

OTHER PUBLICATIONS

Arimoto et al., "Designing emotional speech corpus and its acoustic analysis", IPSJ SIG Technical Reports, Apr. 1, 2008, vol. 2008, No. 12, pp. 133-138.

Principi et al., "Acoustic template-matching for automatic emergency state detection: An ELM based algorithm", Neurocomputing, vol. 149, Part A, pp. 426-434, 2015.

* cited by examiner

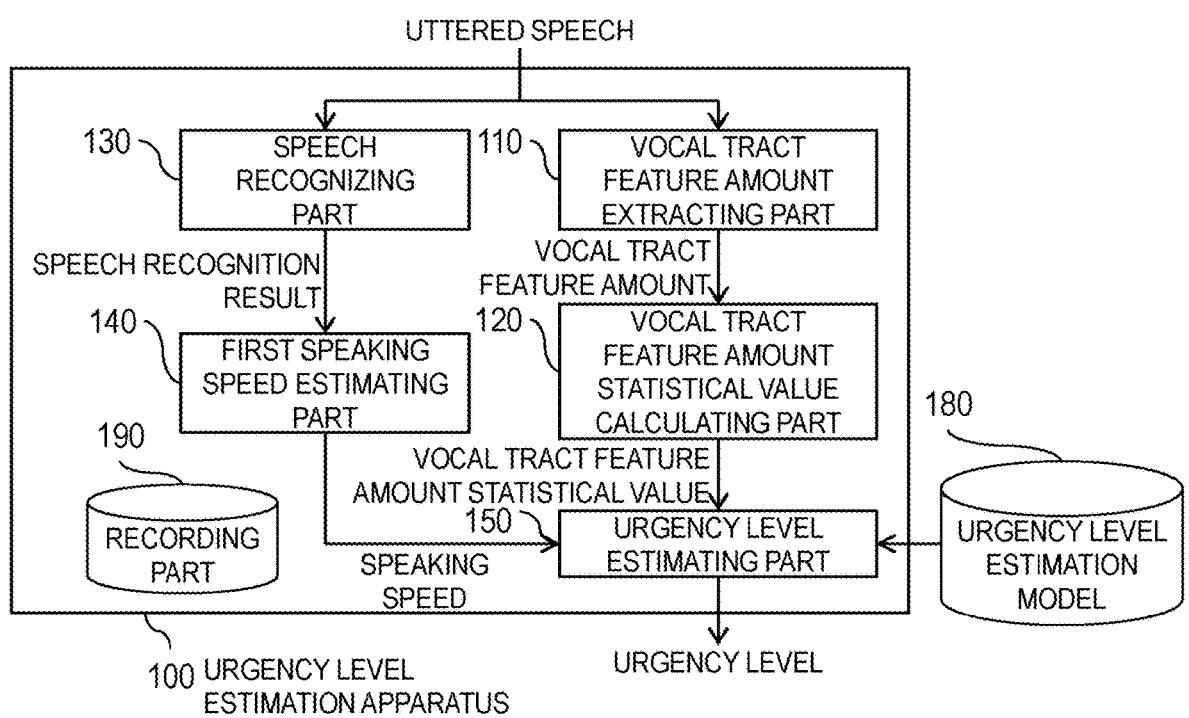

| FRAME NUMBER i | VOCAL TRACT FEATURE AMOUNT c(i) |
|---|---|
| 0 | [-0.7560 , -0.2886 , -0.1550 , -0.0539 , 0.1022 , ... , 0.1273] |
| 1 | [-0.0583 , -0.0154 , 0.0123 , -0.0377 , -0.0001 , ... , -0.0555] |
| 2 | [0.0443 , -0.0159 , 0.0004 , 0.0253 , -0.1054 , ... , -0.3199] |
| 3 | [0.0392 , 0.0121 , -0.0649 , 0.0843 , -0.0168 , ... , -0.6111] |
| 4 | [0.0892 , 0.0711 , -0.0215 , 0.0738 , 0.0272 , ... , -0.3474] |
| 5 | [0.1451 , 0.0958 , -0.0061 , 0.0064 , -0.0240 , ... , -0.2521] |
| ... | ... |
| I | [-0.0216 , 0.1502 , 0.0226 , 0.0090 , 0.1692 , ... , -0.1381] |

| UTTERANCE SECTION NUMBER j | READING w(j) | UTTERANCE START TIME s(j) | UTTERANCE END TIME e(j) |
|---|---|---|---|
| 0 | HELLO | 0.1 | 0.8 |
| 1 | THIS IS UESHIMA | 1.1 | 3.7 |
| 2 | I AM CALLING TO CANCEL MY ORDER | 4.4 | 6.5 |
| ... | ... | ... | ... |
| J | THANK YOU IN ADVANCE | 12.5 | 14.0 |

Fig. 5

| | URGENT SPEECH | | | NON-URGENT SPEECH | | |
|---|---|---|---|---|---|---|
| | AVERAGE VALUE | MEDIAN VALUE | AVERAGE VALUE - MEDIAN VALUE | AVERAGE VALUE | MEDIAN VALUE | AVERAGE VALUE - MEDIAN VALUE |
| F0 [Hz] | 319 | 277 | -42 | 290 | 281 | -9 |

Fig. 6

| FRAME NUMBER k | POSTERIOR PROBABILITY SEQUENCE P(k) | | | | | | | |
|---|---|---|---|---|---|---|---|---|
| | a | i | u | e | o | sh | t | ... |
| 0 | 0.9 | | | | | | | |
| 1 | 0.9 | | | | | | | |
| 2 | 0.5 | | | | | 0.5 | | |
| 3 | | | | | | 0.9 | | |
| 4 | | | | | | 0.9 | | |
| 5 | | 0.7 | | | | 0.3 | | |
| 6 | | 0.9 | | | | | | |
| 7 | | 0.3 | | | | | 0.7 | |
| 8 | | | | | | | 0.9 | |
| 9 | 0.9 | | | | | | 0.1 | |
| 10 | 0.9 | | | | | | | |

* VALUES IN BLANK ARE SUBSTANTIALLY 0.0

Fig. 13

URGENCY LEVEL ESTIMATION APPARATUS, URGENCY LEVEL ESTIMATION METHOD, AND PROGRAM

TECHNICAL FIELD

The present invention relates to a technique for estimating an urgency level of a call from uttered speech.

BACKGROUND ART

When an urgency level of a call can be estimated from speech left on an answering machine, it becomes possible to select a call that should be preferentially handled.

In conventional call urgency level estimation, whether a call is urgent or non-urgent has been estimated from a vocal tract feature amount such as MFCC (Mel-Frequency Cepstral Coefficients) and PNCC (Power Normalized Cepstral Coefficients), for example, for specific words such as "Help" (Non-patent literature 1).

PRIOR ART LITERATURE

Non-Patent Literature

Non-patent literature 1: E. Principi, S. Squartini, E. Cambria, F. Piazza, "Acoustic template-matching for automatic emergency state detection: An ELM based algorithm", Neurocomputing, Vol. 149, Part A, pp. 426-434, 2015.

SUMMARY OF THE INVENTION

Problems to be Solved by the Invention

However, because, in Non-patent literature 1, a vocal tract feature amount of a specific word is used, there is a problem that the urgency level cannot be estimated from speech not including the word.

Therefore, the present invention is directed to providing an urgency level estimation technique for estimating an urgency level of a speaker for free uttered speech, which does not require a specific word.

Means to Solve the Problems

One aspect of the present invention is an urgency level estimation apparatus comprising a feature amount extracting part configured to extract a feature amount of an utterance from uttered speech, and an urgency level estimating part configured to estimate an urgency level of a speaker of the uttered speech from the feature amount based on a relationship between a feature amount extracted from uttered speech and an urgency level of a speaker of the uttered speech, the relationship being determined in advance, in which the feature amount includes at least one of a feature indicating speaking speed of the uttered speech, and a feature indicating voice pitch of the uttered speech, and a feature indicating a power level of the uttered speech.

One aspect of the present invention is an urgency level estimation apparatus comprising a vocal tract feature amount extracting part configured to extract a vocal tract feature amount for each frame obtained by dividing uttered speech, from the uttered speech, a vocal tract feature amount statistical value calculating part configured to calculate a mean and a variance value from the vocal tract feature amount as vocal tract feature amount statistical values of the uttered speech, a speech recognizing part configured to generate a set of reading, an utterance start time and an utterance end time for each utterance section included in the uttered speech, from the uttered speech, a first speaking speed estimating part configured to estimate speaking speed of the uttered speech from the set of the reading, the utterance start time and the utterance end time, and an urgency level estimating part configured to estimate an urgency level of a speaker of the uttered speech from the mean, the variance value, and the speaking speed using an urgency level estimation model learned so that a mean and a variance value of a vocal tract feature amount of uttered speech and speaking speed of the uttered speech are input, and an urgency level of a speaker of the uttered speech is output.

One aspect of the present invention is an urgency level estimation apparatus comprising a vocal tract feature amount extracting part configured to extract a vocal tract feature amount for each frame obtained by dividing uttered speech, from the uttered speech, a vocal tract feature amount statistical value calculating part configured to calculate a mean and a variance value from the vocal tract feature amount as vocal tract feature amount statistical values of the uttered speech, an F0 information extracting part configured to extract F0 information for each frame obtained by dividing the uttered speech, from the uttered speech, an F0 information statistical value calculating part configured to calculate a difference between an average value and a median value of the F0 information, from the F0 information, and an urgency level estimating part configured to estimate an urgency level of a speaker of the uttered speech from the mean, the variance value and the difference using an urgency level estimation model learned so that a mean and a variance value of a vocal tract feature amount of uttered speech, and a difference between an average value and a median value of F0 information of the uttered speech are input, and an urgency level of a speaker of the uttered speech is output.

One aspect of the present invention is an urgency level estimation apparatus comprising a vocal tract feature amount extracting part configured to extract a vocal tract feature amount for each frame obtained by dividing uttered speech, from the uttered speech, a vocal tract feature amount statistical value calculating part configured to calculate a mean and a variance value from the vocal tract feature amount as vocal tract feature amount statistical values of the uttered speech, an F0 information extracting part configured to extract F0 information for each frame obtained by dividing the uttered speech, from the uttered speech, a power extracting part configured to extract power for each frame obtained by dividing the uttered speech, from the uttered speech, a power average adjusting part configured to calculate adjusted power adjusted using power average from the F0 information and the power, a power maximum value calculating part configured to calculate a power maximum value which is a maximum value of the adjusted power, from the adjusted power, and an urgency level estimating part configured to estimate an urgency level of a speaker of the uttered speech from the mean, the variance value and the power maximum value using an urgency level estimation model learned so that a mean and a variance value of a vocal tract feature amount of uttered speech, and a maximum value of adjusted power of the uttered speech are input, and an urgency level of a speaker of the uttered speech is output.

One aspect of the present invention is an urgency level estimation apparatus comprising a vocal tract feature amount extracting part configured to extract a vocal tract feature amount for each frame obtained by dividing uttered speech, from the uttered speech, a vocal tract feature amount statistical value calculating part configured to calculate a mean and a variance value from the vocal tract feature amount as vocal tract feature amount statistical values of the uttered speech, a posterior probability sequence estimating part configured to estimate a posterior probability sequence indicating a probability of sound corresponding to a frame obtained by dividing the uttered speech, the sound being each phoneme, from the tittered speech, using a speech recognition acoustic model for identifying a phoneme from input sound, a second speaking speed estimating part configured to estimate speaking speed of the uttered speech from the posterior probability sequence using a speaking speed estimation model learned so that a posterior probability sequence of uttered speech is input, and speaking speed of the uttered speech is output, and an urgency level estimating part configured to estimate an urgency level of a speaker of the uttered speech from the mean, the variance value and the speaking speed using an urgency level estimation model learned so that a mean and a variance value of a vocal tract feature amount of uttered speech, and speaking speed of the uttered speech are input, and an urgency level of a speaker of the uttered speech is output.

Effects of the Invention

According to the present invention, it becomes possible to estimate an urgency level of a speaker for free uttered speech, which does not require a specific word.

BRIEF DESCRIPTION OF THE DRAWINGS

FIG. 1 is a view illustrating an example of a difference in speaking speed (seconds per mora) between urgent speech and non-urgent speech;
FIG. 2 is a block diagram illustrating an example of a configuration of an urgency level estimation apparatus 100;
FIG. 5 is a view illustrating an example of a speech recognition result;
FIG. 6 is a view illustrating an example of average values, median values, and differences between the average values and the median values of F0 of urgent speech and non-urgent speech;
FIG. 13 is a view illustrating an example of a posterior probability sequence.

DETAILED DESCRIPTION OF THE EMBODIMENTS

Embodiments of the present invention will be described in detail below. Note that the same numbers will be assigned to components having the same functions, and overlapped description will be omitted.

First Embodiment

FIG. 1 illustrate a result of analyzing speaking speed (hereinafter, referred to as speaking speed) in urgent/non-urgent speech using a plurality of pieces of voicemail simulated speech. From this drawing, it can be seen that the speaking speed, that is, the number of seconds per mora (phonological segment) is smaller in the urgent speech. Therefore, in the first embodiment, the urgency level is estimated using the speaking speed. Note that a statistical value of a vocal tract feature amount used conventionally is also used along with the speaking speed in urgency level estimation.

Figures 3, 4:
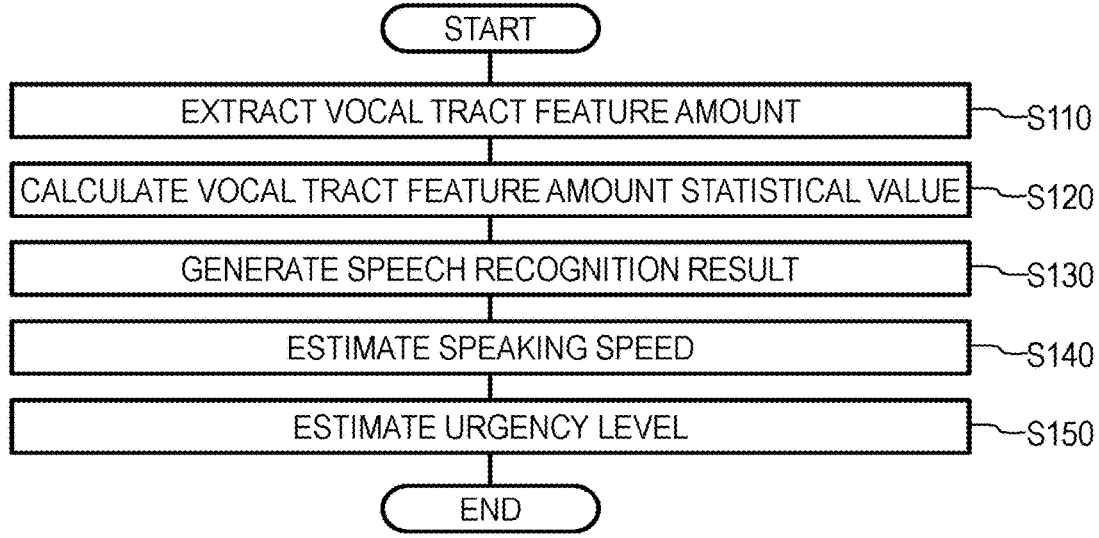
FIG. 3 is a flowchart illustrating an example of operation of the urgency level estimation apparatus 100.
FIG. 4 is a view illustrating an example of a vocal tract feature amount.

An urgency level estimation apparatus 100 will be described below with reference to FIGS. 2 to 3. FIG. 2 is a block diagram illustrating a configuration of the urgency level estimation apparatus 100. FIG. 3 is a flowchart illustrating operation of the urgency level estimation apparatus 100. As illustrated in FIG. 2, the urgency level estimation apparatus 100 includes a vocal tract feature amount extracting part 110, a vocal tract feature amount statistical value calculating part 120, a speech recognizing part 130, a first speaking speed estimating part 140, an urgency level estimating part 150, and a recording part 190. The recording part 190 is a component which records information necessary for processing of the urgency level estimation apparatus 100 as appropriate.

The urgency level estimation apparatus 100 reads an urgency level estimation model 180 and executes processing. The urgency level estimation model 180 may be configured to be recorded in an external recording part as illustrated in FIG. 2 or may be configured to be recorded in the recording part 190.

The urgency level estimation apparatus 100 estimates an urgency level of a speaker of uttered speech s(t) from uttered speech s(t) (t=0, 1, 2, . . . , T, t represents a sample number) and outputs the urgency level. The uttered speech s(t) is a speech signal sampled every unit time, and, for example, speech of a message left on an answering machine.

Operation of the urgency level estimation apparatus 100 will be described with reference to FIG. 3. The vocal tract feature amount extracting part 110 receives the uttered speech s(t) (t=0, 1, 2, . . . , T) as input, and extracts and outputs a vocal tract feature amount c(i) (i=0, 1, 2, . . . , I, i represents a frame number) for each frame obtained by dividing the uttered speech s(t) (S110). As the vocal tract feature amount, for example, MFCC or cepstrum can be used. Further, any method may be used for the extraction. The vocal tract feature amount c(i) can be obtained as a vector sequence corresponding to a time length of the speech as illustrated in, for example, FIG. 4. In FIG. 4, the length of the sequence is the total number of frames I.

The vocal tract feature amount statistical value calculating part 120 calculates a mean mean(c) and a variance value var(c) as vocal tract feature amount statistical values of the uttered speech s(t) from the vocal tract feature amount c(i) (i=0, 1, 2, . . . , I) extracted in S110, and outputs the mean mean(c) and the variance value var(c) (S120). The mean mean(c) and the variance value var(c) can be respectively calculated using the following formulas.

$$\text{mean}(c) = \frac{1}{I} \sum_{i=0}^{I} c(i)$$ [Formula 1]

$$\text{var}(c) = \frac{1}{I} \sum_{i=0}^{I} (c(i) - \text{mean}(c))^2$$

The speech recognizing part 130 generates a speech recognition result W(j) (j=1, 2, . . . , J, j represents an utterance section number) for each utterance section included in the uttered speech s(t) from the uttered speech s(t) (t=0, 1, 2, . . . , T) and outputs the speech recognition result W(j) (S130). Here, the speech recognition result W(j) (j=1, 2, . . . , J) is the speech recognition result of the utterance section detected from the uttered speech s(t) using a predetermined method. While any method may be used for the speech recognition, instead of text in which kanji and kana are mixed which is normally generated as the speech recognition result, a set of reading w(j) of the utterance section j, utterance start time s(j) and utterance end time e(j), corresponding to additional information is set as the speech recognition result W(j) (see FIG. 5). The reading w(j) is a sentence that describes pronounced sound in kana. Further, the utterance start time s(j) and the utterance end time e(j) are values respectively indicating start time (second) and end time (second) of the speech signal in the utterance section j. Note that the utterance start time and the utterance end time of each utterance section are displayed assuming that the start time of the uttered speech s(t) is 0 seconds. In other words, the speech recognizing part 130 generates a set of the reading w(j), the utterance start time s(j) and the utterance end time e(j) (j=1, 2, . . . , J) for each utterance section included in the uttered speech s(t) from the uttered speech s(t) (t=0, 1, 2, . . . , T) and outputs the set (S130).

The first speaking speed estimating part 140 estimates the speaking speed mean(r) of the uttered speech s(t) from the speech recognition result W(j) generated in S130 (that is, a set of the reading w(j), the speech start time s(j), and the speech end time e(j)) (j=1, 2, . . . , J), and outputs the speaking speed mean(r) (S140). In estimation of the speaking speed mean(r), mean(r) [seconds/mora] is obtained from an utterance period and the number of mora assuming the number of characters obtained by excluding contracted sound ("ya", "yu", "yo") included in the reading w(j) as the number of mora. When the number of characters excluding contracted sound included in the reading w(j) is set as len(w(j)), the speaking speed mean(r) can be obtained by the following formula.

$$\text{mean}(r) = \frac{\sum_{j=0}^{J}(e(j) - s(j))}{\sum_{j=0}^{J}\text{len}(w(j))}$$ [Formula 2]

Here, e(j)-s(j) is a period (utterance period) required to utter the reading w(j).

From this formula, it can be seen that the speaking speed mean(r) is average speaking speed of the uttered speech.

The urgency level estimating part 150 estimates an urgency level of a speaker of the uttered speech s(t) (t=0, 1, 2, . . . , T) from the mean mean(c), the variance value var(c) calculated in S120 and the speaking speed mean(r) estimated in S140 using the urgency level estimation model 180 and outputs the urgency level (S150). In the urgency level estimation model 180, a mean and a variance value of a vocal tract feature amount of uttered speech and speaking speed of the uttered speech are input, and an urgency level of a speaker of the uttered speech is output.

The urgency level estimation model is generated by machine learning such as, for example, a support vector machine (SVM), a random forest, and a neural network. Specifically, first, sets each including feature amounts (here, the mean mean(c), the variance value var(c), the speaking speed mean(r)) obtained from a speech signal whose urgency level is known in advance, and information (correct answer label) indicating the urgency level of the speech signal are prepared as learning data. Next, the urgency level is estimated using this learning data, using the feature amounts as input, and using the urgency level estimation model, and parameters of the urgency level estimation model are updated so as to make an error between the urgency level which is an estimation result and an urgency level of the correct answer label smaller. Note that appropriate initial values are given as the parameters of the urgency level estimation model upon start of learning of the urgency level estimation model. Then, updating (that is, learning) of the parameters is finished when predetermined conditions are satisfied. Note that the correct answer label may have two stages of urgency and non-urgency, or may have three or more stages by dividing the urgency level into three or more ranks.

According to the present invention, it becomes possible to estimate an urgency level of a speaker for free uttered speech, which does not require a specific word.

Second Embodiment

FIG. 6 illustrates a result of analyzing voice pitch (F0) of urgent/non-urgent speech using a plurality of pieces of voicemail simulated speech. From this drawing, it can be seen that voice tends to be higher on average in case of urgency. Therefore, in the second embodiment, the urgency level is estimated using the voice pitch of the speech. Note that the statistical values of the vocal tract feature amount are also used in a similar manner to the first embodiment.

Note that it is difficult to estimate the urgency/non-urgency only from an average value of F0, because the average pitch of the voice varies depending on genders and individuals. Therefore, here, a difference from the average value and a median value of F0 is used as the feature amount for estimation by utilizing characteristics that the median value of F0 in urgent/non-urgent speech does not change significantly. By this means it becomes possible to estimate the urgency level while absorbing individuality of F0.

Figure 7:
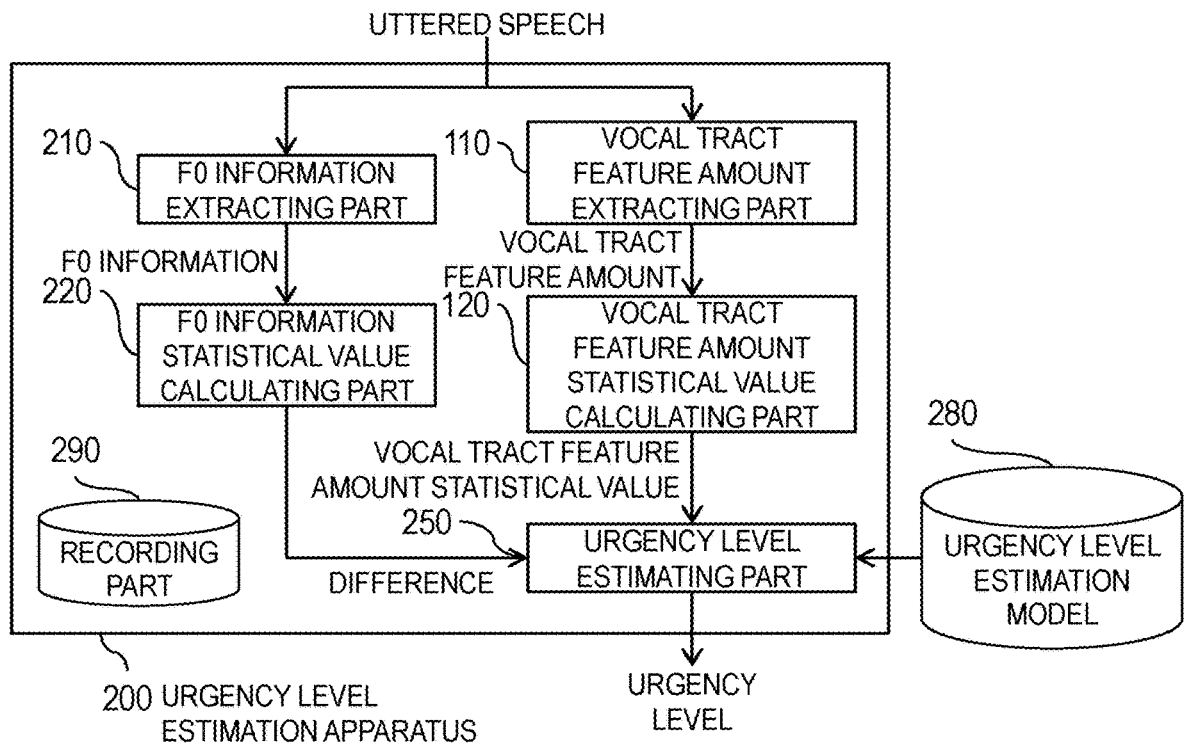
FIG. 7 is a block diagram illustrating an example of a configuration of an urgency level estimation apparatus 200.
Figure 8:
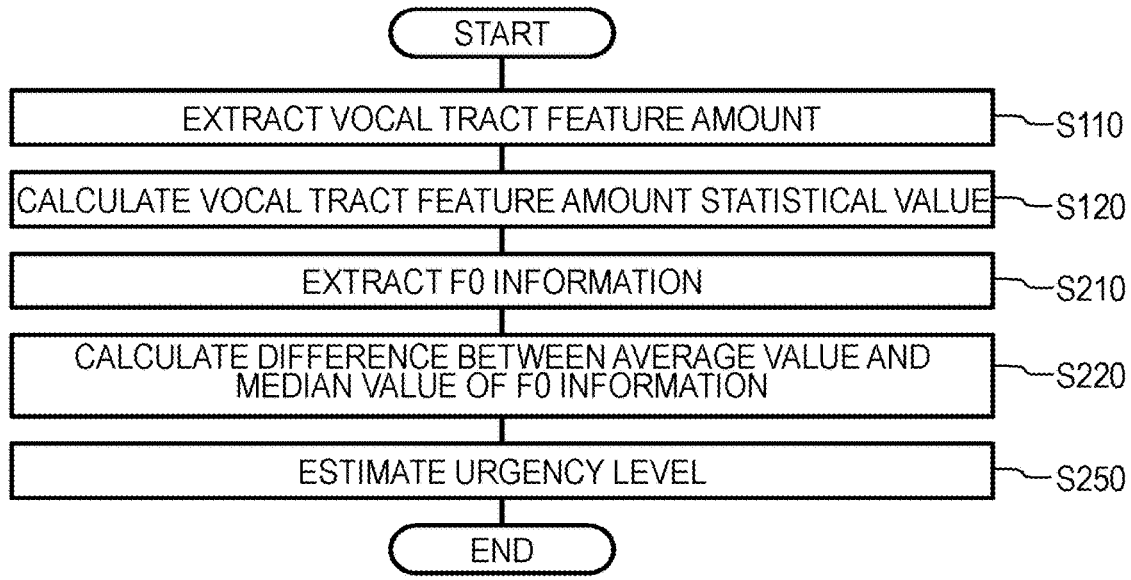
FIG. 8 is a flowchart illustrating an example of operation of the urgency level estimation apparatus 200.

An urgency level estimation apparatus 200 will be described below with reference to FIGS. 7 to 8. FIG. 7 is a block diagram illustrating a configuration of the urgency level estimation apparatus 200. FIG. 8 is a flowchart illustrating operation of the urgency level estimation apparatus 200. As illustrated in FIG. 7, the urgency level estimation apparatus 200 includes the vocal tract feature amount extracting part 110, the vocal tract feature amount statistical value calculating part 120, an F0 information extracting part 210, an F0 information statistical value calculating part 220, and an urgency level estimating part 250, and a recording part 290. The recording part 290 is a component which records information necessary for processing of the urgency level estimation apparatus 200 as appropriate.

The urgency level estimation apparatus 200 reads an urgency level estimation model 280 and executes processing. The urgency level estimation model 280 may be configured to be recorded in an external recording part as illustrated in FIG. 7 or may be configured to be recorded in the recording part 290.

The urgency level estimation apparatus 200 estimates the urgency level of a speaker of the uttered speech s(t) from the uttered speech s(t) (t=0, 1, 2, . . . , T, t represents a sample number) and outputs the urgency level.

Operation of the urgency level estimation apparatus 200 will be described with reference to FIG. 8. The vocal tract feature amount extracting part 110 receives the uttered speech s(t) (t=0, 1, 2, . . . , T) as input, and extracts and outputs a vocal tract feature amount c(i) (i=0, 1, 2, . . . , I, i represents a frame number) for each frame obtained by dividing the uttered speech s(t) (S110). The vocal tract feature amount statistical value calculating part 120 calculates a mean mean(c) and a variance value var(c) as vocal tract feature amount statistical values of the uttered speech s(t) from the vocal tract feature amount c(i) (i=0, 1, 2, . . . , I) extracted in S110, and outputs the mean mean(c) and the variance value var(c) (S120).

Figure 9:
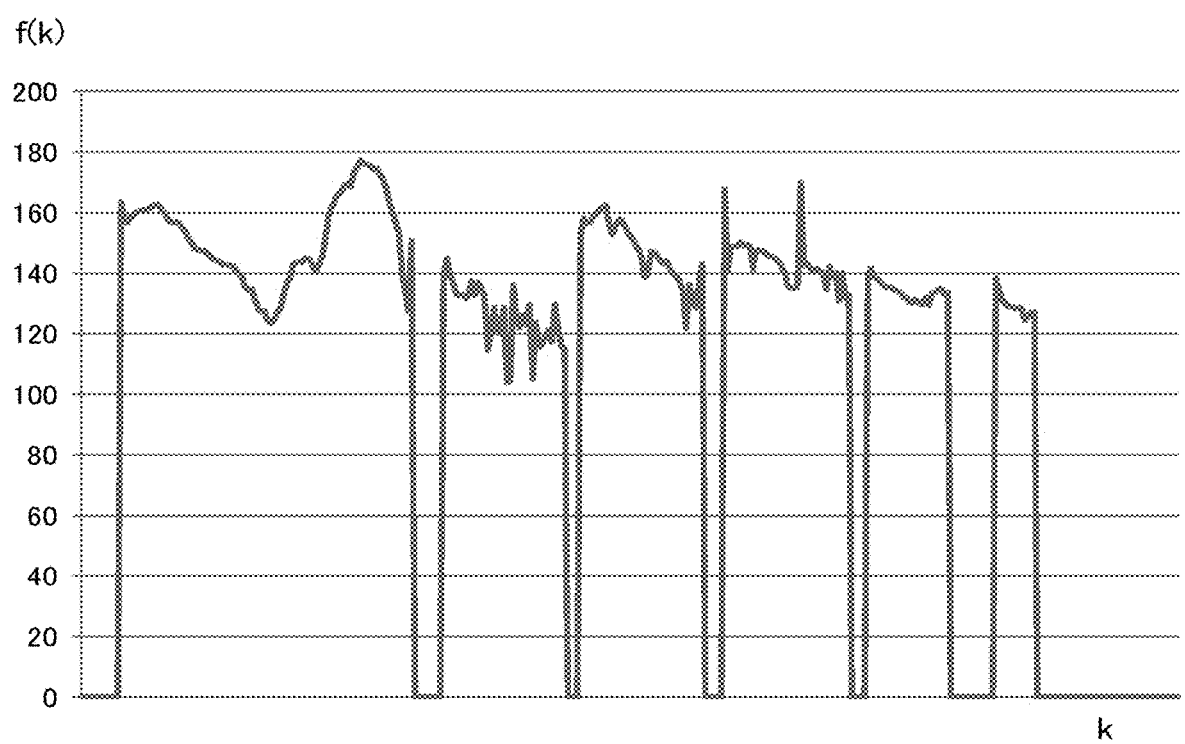
FIG. 9 is a view illustrating an example of F0 information.

The F0 information extracting part 210 receives the uttered speech s(t) (t=0, 1, 2, . . . , T) as input, and extracts and outputs F0 information f(k) (k=0, 1, 2, . . . , K, k represents a frame number) for each frame obtained by dividing the uttered speech s(t) (S210). The F0 information f(k) is a feature amount of the voice pitch in a frame k. Any method may be used to extract the F0 information. FIG. 9 illustrates an example of the extracted F0 information.

The F0 information statistical value calculating part 220 calculates a difference medave(f) between the average value and the median value of the F0 information from the F0 information f(k) (k=0, 1, 2, . . . , K) extracted in S210 and outputs the difference medave(f) (S220). As can be seen from FIG. 9, the value of F0 is 0 in a section which is not a voiced section (unvoiced or silent section). If the average value or the median value is obtained in a section including a section in which the value of F0 is 0, because features other than the features of the uttered speech are also included, the average ave(f) and the median value med(f) of the F0 information are obtained using only the voiced section. Specifically, the average value and the median value are obtained as follows. First, a voiced/unvoiced determination result v(f(k)) indicating whether or not the frame k is a voiced section is defined by the following formula.

$$v(f(k)) = \begin{cases} 0 & f(k) = 0 \\ 1 & f(k) > 0 \end{cases} \quad \text{[Formula 3]}$$

Next, the median value med(f) of the F0 information is calculated as an average value of a minimum value min(f) of the F0 information and a maximum value max(f) of the F0 information.

$$\min(f) = \min_{k \in \{k | v(f(k))=1\}} f(k) \quad \text{[Formula 4]}$$

$$\max(f) = \max_{k \in \{k | v(f(k))=1\}} f(k)$$

$$med(f) = \frac{\max(f) + \min(f)}{2}$$

Further, the average value ave(f) of the F0 information is calculated by the following formula.

$$ave(f) = \frac{\sum_{k=0}^{K} f(k)}{\sum_{k=0}^{K} v(f(k))} \quad \text{[Formula 5]}$$

Then, the difference medave(f) is calculated by the following formula.

$$medave(f) = ave(f) - med(f) \quad \text{[Formula 6]}$$

The urgency level estimating part 250 estimates the urgency level of a speaker of the uttered speech s(t) (t=0, 1, 2, . . . , T) from the mean mean(c) and the variance value var(c) calculated in S120, and the difference medave (f) calculated in S220 using the urgency level estimation model 280 and outputs the urgency level of a speaker (S250). In the urgency level estimation model 280, a mean and a variance value of a vocal tract feature amount of uttered speech and a difference between an average value and a median value of F0 information of the uttered speech are input, and an urgency level of a speaker of the uttered speech is output. The learning method of the urgency level estimation model 280 may be similar to that in the first embodiment.

According to the present invention, it becomes possible to estimate an urgency level of a speaker for free uttered speech, which does not require a specific word.

Third Embodiment

Figure 10A:
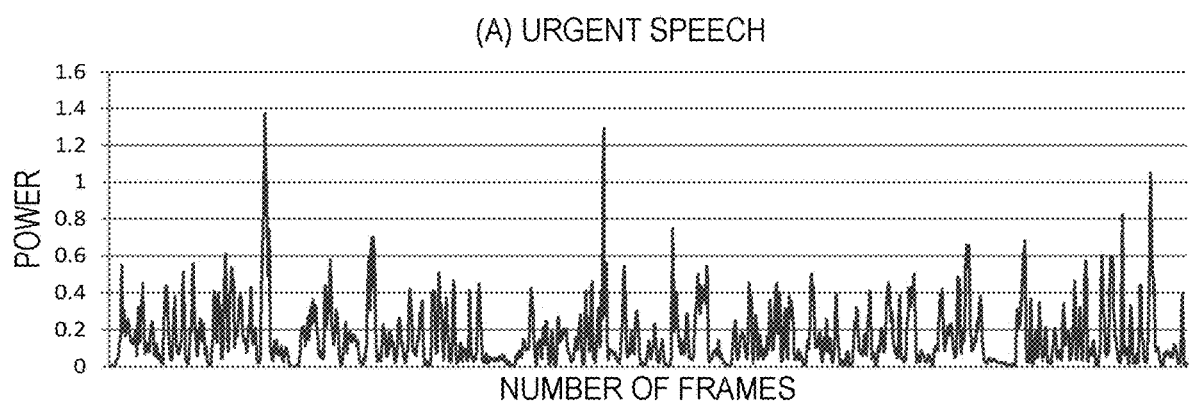
FIG. 10A is a view illustrating an example of change of power of urgent speech.
Figure 10B:
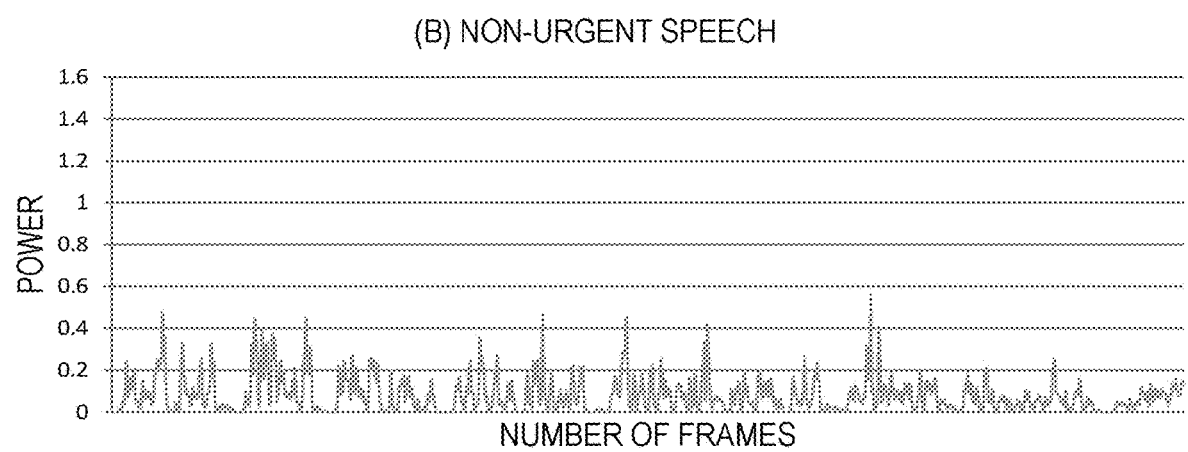
FIG. 10B is a view illustrating an example of change of power of non-urgent speech.

While power of the uttered speech varies depending on telephone devices, as can be seen from FIGS. 10A and 10B, when the average power of one utterance is aligned and speech with a high urgency level is compared with speech with a low urgency level, voice in the speech with a high urgency level tends to be partially strong. Therefore, in the third embodiment, the urgency level is estimated by using strength of the voice while the average power is aligned and a maximum value of the power is set as the strength of the voice. Note that the statistical values of the vocal tract feature am omit are also used in a similar manner to the first embodiment.

Figure 11:
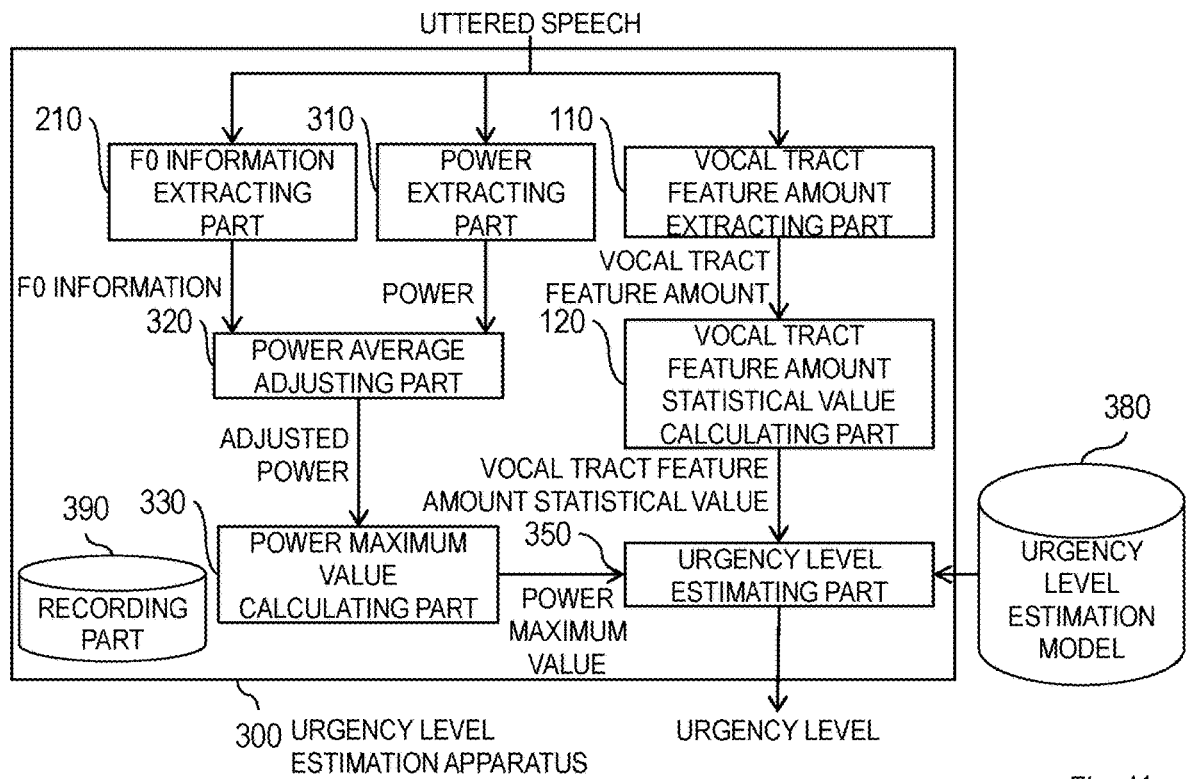
FIG. 11 is a block diagram illustrating an example of a configuration of an urgency level estimation apparatus 300.
Figure 12:
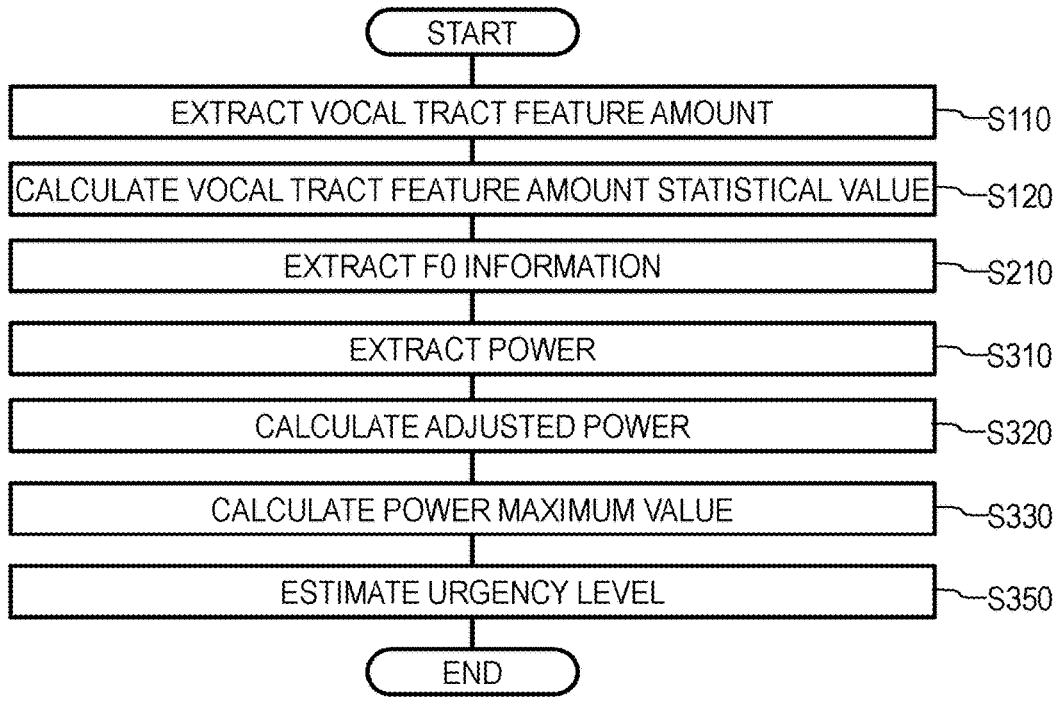
FIG. 12 is a flowchart illustrating an example of operation of the urgency level estimation apparatus 300.

An urgency level estimation apparatus 300 will be described below with reference to FIGS. 11 to 12. FIG. 11 is a block diagram illustrating a configuration of the urgency level estimation apparatus 300. FIG. 12 is a flowchart illustrating operation of the urgency level estimation apparatus 300. As illustrated in FIG. 11, the urgency level estimation apparatus 300 includes the vocal tract feature amount extracting part 110, the vocal tract feature amount statistical value calculating part 120, the F0 information extracting part 210, a power extracting part 310, a power average adjusting part 320, and a power maximum value calculating part 330, an urgency level estimating part 350, and a recording part 390. The recording part 390 is a component which records information necessary for processing of the urgency level estimation apparatus 300 as appropriate.

The urgency level estimation apparatus 300 reads an urgency level estimation model 380 and executes processing. Note that the urgency level estimation model 380 may be configured to be recorded in an external recording part as illustrated in FIG. 11 or may be configured to be recorded in the recording part 390.

The urgency level estimation apparatus 300 estimates the urgency level of a speaker of the uttered speech s(t) from the uttered speech s(t) (t=0, 1, 2, ..., T, t represents a sample number) and outputs the urgency level of a speaker.

Operation of the urgency level estimation apparatus 300 will be described with reference to FIG. 12. The vocal tract feature amount extracting part 110 receives the uttered speech s(t) (t=0, 1, 2, ..., T) as input, and extracts and outputs a vocal tract feature amount c(i) (i=0, 1, 2, ..., I, i represents a frame number) for each frame obtained by dividing the uttered speech s(t) (S110). The vocal tract feature amount statistical value calculating part 120 calculates a mean mean(c) and a variance value var(c) as vocal tract feature amount statistical values of the uttered speech s(t) from the vocal tract feature amount c(i) (i=0, 1, 2, ..., I) extracted in S110, and outputs the mean mean(c) and the variance value var(c) (S120). The F0 information extracting part 210 receives the uttered speech s(t) (t=0, 1, 2, ..., T) as input, and extracts and outputs F0 information f(k) (k=0, 1, 2, ..., K, k represents a frame number) for each frame obtained by dividing the uttered speech s(t) (S210).

The power extracting part 310 receives the uttered speech s(t) (t=0, 1, 2, ..., T) as input, and extracts and outputs power p(k) (k=(0, 1, 2, ..., K, k represents a frame number) for each frame obtained by dividing the uttered speech s(t) (S310). The power p(k) is a feature amount of strength of the voice in the frame k. Any method may be used for the power extraction.

The power average adjusting part 320 calculates adjusted power p'(k) (k=0, 1, 2, ..., K) from the F0 information f(k) (k=0, 1, 2, ..., K) extracted in S210 and the power p(k) (k=0, 1, 2, ..., K) extracted in S310 using the power average and outputs the adjusted power p'(k) (S320). The uttered speech includes a silent section (that is, a section in which no speech is contained). Therefore, if the power average is calculated in a section including the silent section, the calculated power average is likely to be small in a frame k with many silent sections, so that there is a case where the calculated adjusted power p'(k) is large. Therefore, by dividing the power by the power average for a voiced section (frame where f(k)>0) where there can be certainly speech to align the power, it is possible to obtain power (that is, adjusted power) which absorbs a difference in a recording level of the telephone regardless of a time length of the silent section. Specifically, the power is obtained as follows. First, a voiced/unvoiced determination result v(f(k)) indicating whether or not the frame k is a voiced section is defined by the following formula.

$$v(f(k)) = \begin{cases} 0 & f(k) = 0 \\ 1 & f(k) > 0 \end{cases}$$ [Formula 7]

Then, the adjusted power p'(k) is calculated using the following formula.

$$p'(k) = \frac{p(k)}{\text{mean}(p)}$$ [Formula 8]

$$\text{mean}(p) = \frac{\sum_{k=0}^{K} v(f(k)) * p(k)}{\sum_{k=0}^{K} v(f(k))}$$

The power maximum value calculating part 330 calculates a power maximum value max(p) which is a maximum value of the adjusted power from the adjusted power p'(k) (k=0, 1, 2, ..., K) calculated in S320 and outputs the power maximum value max(p) (S330). The power maximum value max(p) can be obtained using the following formula.

$$\max(p) = \max_{k} p'(k)$$ [Formula 9]

The urgency level estimating part 350 estimates the urgency level of a speaker s(t) (t=0, 1, 2, ..., T) from the mean mean(c) and the variance value var(c) calculated in S120 and the power maximum value max(p) calculated in S330 using the urgency level estimation model 380 and outputs the urgency level of a speaker of the uttered speech s(t) (S350). In the urgency level estimation model 380, a mean and a variance value of a vocal tract feature amount of uttered speech and a maximum value of adjusted power of the uttered speech are input, and an urgency level of a speaker of the uttered speech is output. A learning method of the urgency level estimation model 380 may be similar to that in the first embodiment.

According to the present invention, it becomes possible to estimate an urgency level of a speaker for free uttered speech, which does not require a specific word.

Fourth Embodiment

While, in the first embodiment, the speaking speed is estimated using speech recognition, if a word used in the uttered speech is not included in a model to be used for speech recognition, because an accurate speech recognition result cannot be obtained, the speaking speed cannot be correctly estimated. Therefore, tuning work for registering words in the model to be used for speech recognition is indispensable. However, it is not realistic to register all words in advance for utterances without restrictions, such as messages left on the answering machine. Therefore, in the fourth embodiment, the urgency level is estimated using speaking speed estimated from change in posterior probability (a posteriori probability sequence) of an acoustic model for speech recognition (a model for identifying which phoneme the input sound is). Note that the statistical value of the vocal tract feature amount is also used in a similar manner to the first embodiment.

FIG. 13 illustrates an example of the posterior probability sequence. In the table in FIG. 13, a horizontal direction is phoneme information, a vertical direction is time (frame number), and a value in each field is a value indicating how much degree of probability a phoneme corresponding to the sound in each frame is correct. When the speaking speed is fast, transition of the posterior probability is fast, while, when the speaking speed is slow, the transition of the posterior probability is slow. By capturing characteristics of the speed of the transition and obtaining the speaking speed approximately, it is possible to estimate the speaking speed even if an accurate speech recognition result cannot be obtained.

Figure 14:
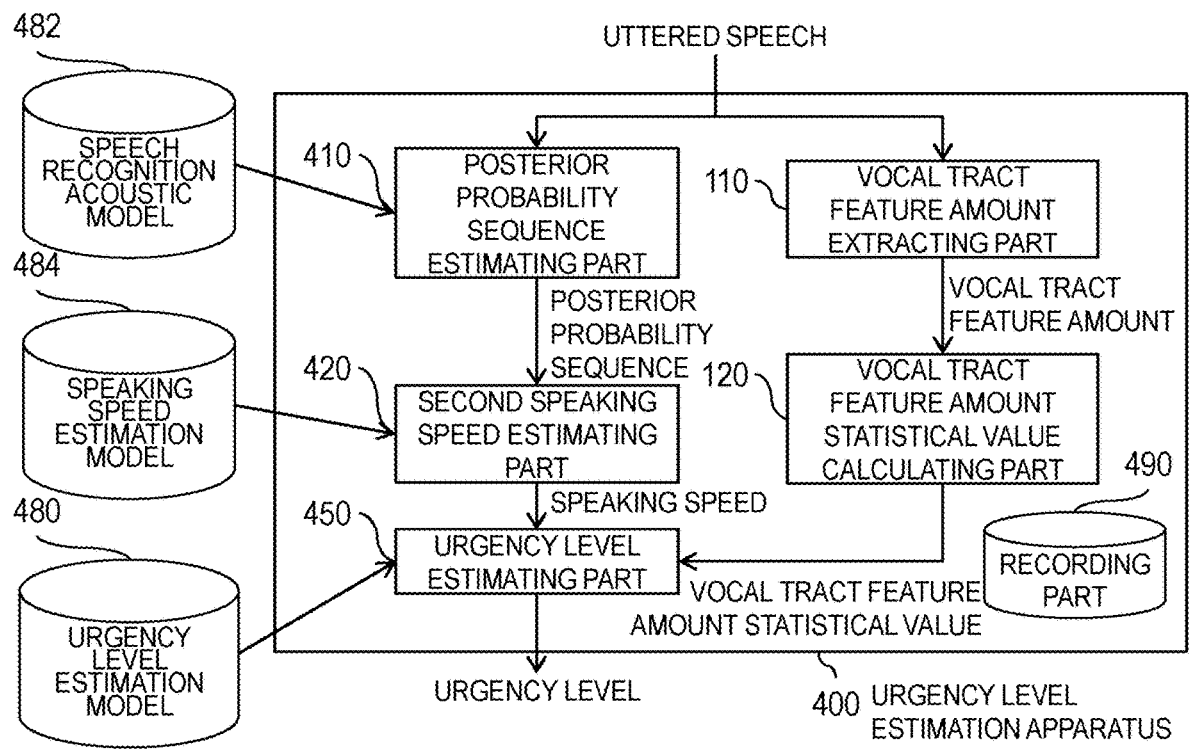
FIG. 14 is a block diagram illustrating an example of a configuration of an urgency level estimation apparatus 400.
Figure 15:
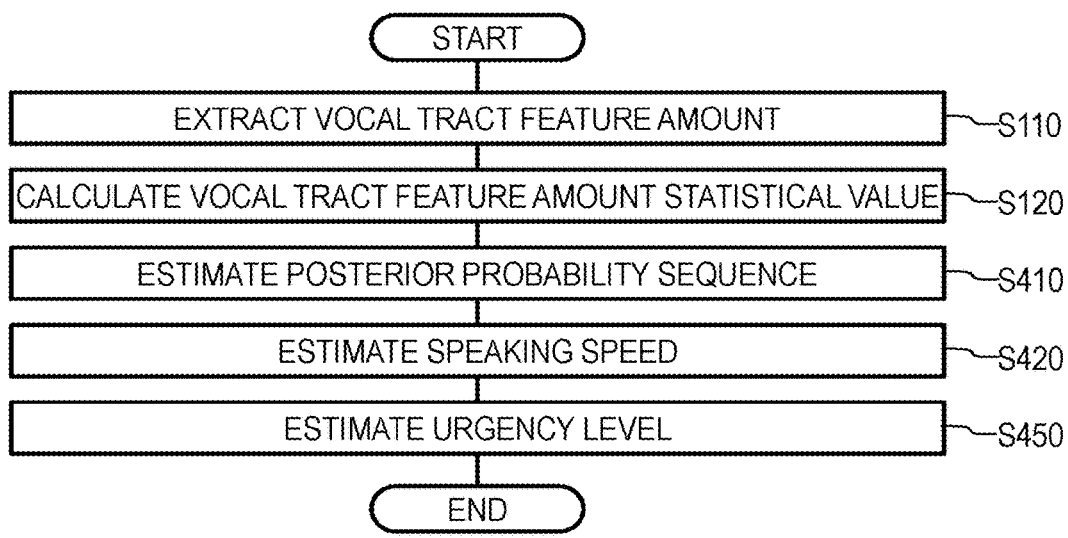
FIG. 15 is a flowchart illustrating an example of operation of the urgency level estimation apparatus 400.

An urgency level estimation apparatus 400 will be described below with reference to FIGS. 14 to 15. FIG. 14 is a block diagram illustrating a configuration of the urgency level estimation apparatus 400. FIG. 15 is a flowchart illustrating operation of the urgency level estimation apparatus 400. As illustrated in FIG. 14, the urgency level estimation apparatus 400 includes the vocal tract feature amount extracting part 110, the vocal tract feature amount statistical value calculating part 120, a posterior probability sequence estimating part 410, a second speaking speed estimating part 420, and an urgency level estimating part 450 and a recording part 490. The recording part 490 is a component which records information necessary for processing of the urgency level estimation apparatus 400 as appropriate.

The urgency level estimation apparatus 400 reads an urgency level estimation model 480, a speech recognition acoustic model 482, and a speaking speed estimation model 484, and executes processing. Note that the urgency level estimation model 480, the speech recognition acoustic model 482, and the speaking speed estimation model 484 may be configured to be recorded in an external recording part as illustrated in FIG. 14 or may be configured to be recorded in the recording part 490.

The urgency level estimation apparatus 400 estimates the urgency level of a speaker of the uttered speech s(t) from the uttered speech s(t) (t=0, 1, 2, . . . , T, t represents a sample number) and outputs the urgency level of a speaker of the uttered speech s(t).

Operation of the urgency level estimation apparatus 400 will be described with reference to FIG. 15. The vocal tract feature amount extracting part 110 receives the uttered speech s(t) (t=0, 1, 2, . . . , T) as input, and extracts and outputs a vocal tract feature amount c(i) (i=0, 1, 2, . . . , I, i represents a frame number) for each frame obtained by dividing the uttered speech s(t) (S110). The vocal tract feature amount statistical value calculating part 120 calculates a mean mean(c) and a variance value var(c) as a vocal tract feature amount statistical value of the uttered speech s(t) from the vocal tract feature amount c(i) (i=0, 1, 2, . . . , I) extracted in S110, and outputs the mean mean(c) and the variance value var(c) (S120).

The posterior probability sequence estimating part 410 estimates a posterior probability sequence P(k) (k=0, 1, 2, . . . , K, k represents a frame number) indicating a probability of sound corresponding to the frame k obtained by dividing the uttered speech s(t) being each phoneme, from the uttered speech s(t) (t=0, 1, 2, . . . , T) using the speech recognition acoustic model 482 which identifies phonemes from input sound and outputs the posterior probability sequence P(k) (S410). The posterior probability sequence P(k) is a vector that is a probability of sound whose element corresponds to the frame k being each phoneme. Accordingly, a value of each element of the posterior probability sequence P(k) is a value between 0 and 1 (both inclusive), and the sum thereof is 1. The posterior probability sequence is estimated using a typical speech recognition model such as a deep neural network (DNN) or a long short-term memory network (LSTM). While the posterior probability sequence in FIG. 13 is a monophonic one-state posterior probability sequence, a triphonic three-state hybrid deep neural network-hidden Markov model (DNN-HMM) which is typically used in speech recognition may be used.

The second speaking speed estimating part 420 estimates speaking speed mean(r2) of the uttered speech s(t) from the posterior probability sequence P(k) (k=0, 1, 2, . . . , K) estimated in S410 using the speaking speed estimation model 484 and outputs the speaking speed mean(r2) of the uttered speech s(t) (S420). In the speaking speed estimation model 484, a posterior probability sequence of uttered speech is input, and speaking speed of the uttered speech is output. The speaking speed estimation model 484 can be configured using a neural network such as a time series model like an LSTM. Specifically, parameters of the speaking speed estimation model (neural network) are learned as follows. First, a plurality of speech signals to be used for learning the speaking speed estimation model are prepared. Next, a posterior probability sequence is obtained for each speech signal using a method similar to that for the posterior probability sequence estimating part 410. This posterior probability sequence is used as input of the speaking speed estimation model to be learned. Further, for each speech signal, transcription data is created, start time and end time of respective phonemes constituting the transcription data are obtained, and the speaking speed of the speech signal is obtained using a method similar to that for the first speaking speed estimating part 140. At that time, it is only necessary to use the transcription data instead of the reading used in the first speaking speed estimating part 140. The speaking speed obtained here becomes the correct answer label. Then, the speaking speed is estimated using the posterior probability sequence as input and using the speaking speed estimation model, and parameters of the speaking speed estimation model are updated so that an error between the speaking speed which is the estimation result and the speaking speed of the correct answer label becomes smaller.

The urgency level estimating part 450 estimates the urgency level of a speaker of the uttered speech s(t) (t=0, 1, 2, . . . , T) from the mean mean(c) and the variance value var(c) calculated in S120, and the speaking speed mean(r2) estimated in S420 using the urgency level estimation model 480 and outputs the urgency level of a speaker of the uttered speech s(t) (S450). In the urgency level estimation model 480, a mean and a variance value of a vocal tract feature amount of uttered speech and speaking speed of the uttered speech are input, and an urgency level of a speaker of the uttered speech is output. A learning method of the urgency level estimation model 480 may be similar to that in the first embodiment.

According to the present invention, it becomes possible to estimate an urgency level of a speaker for free uttered speech, which does not require a specific word.

Fifth Embodiment

While, from the first embodiment to the fourth embodiment, the urgency level is estimated by combining the vocal tract feature amount statistical value with one of the feature amounts of the speaking speed, the voice pitch, and the strength of the voice (power level), the urgency level may be estimated by combining the vocal tract feature amount statistical value with two or more feature amounts of the speaking speed, the voice pitch, and the strength of the voice. Thus, in the fifth embodiment, a configuration where the urgency level is estimated using combination of the feature amounts used in the first to fourth embodiments will be described. Here, first, a configuration where three feature amounts indicated by the speaking speed in the first embodiment, the voice pitch in the second embodiment and the strength of the voice in the third embodiment are used will be described.

Figure 16:
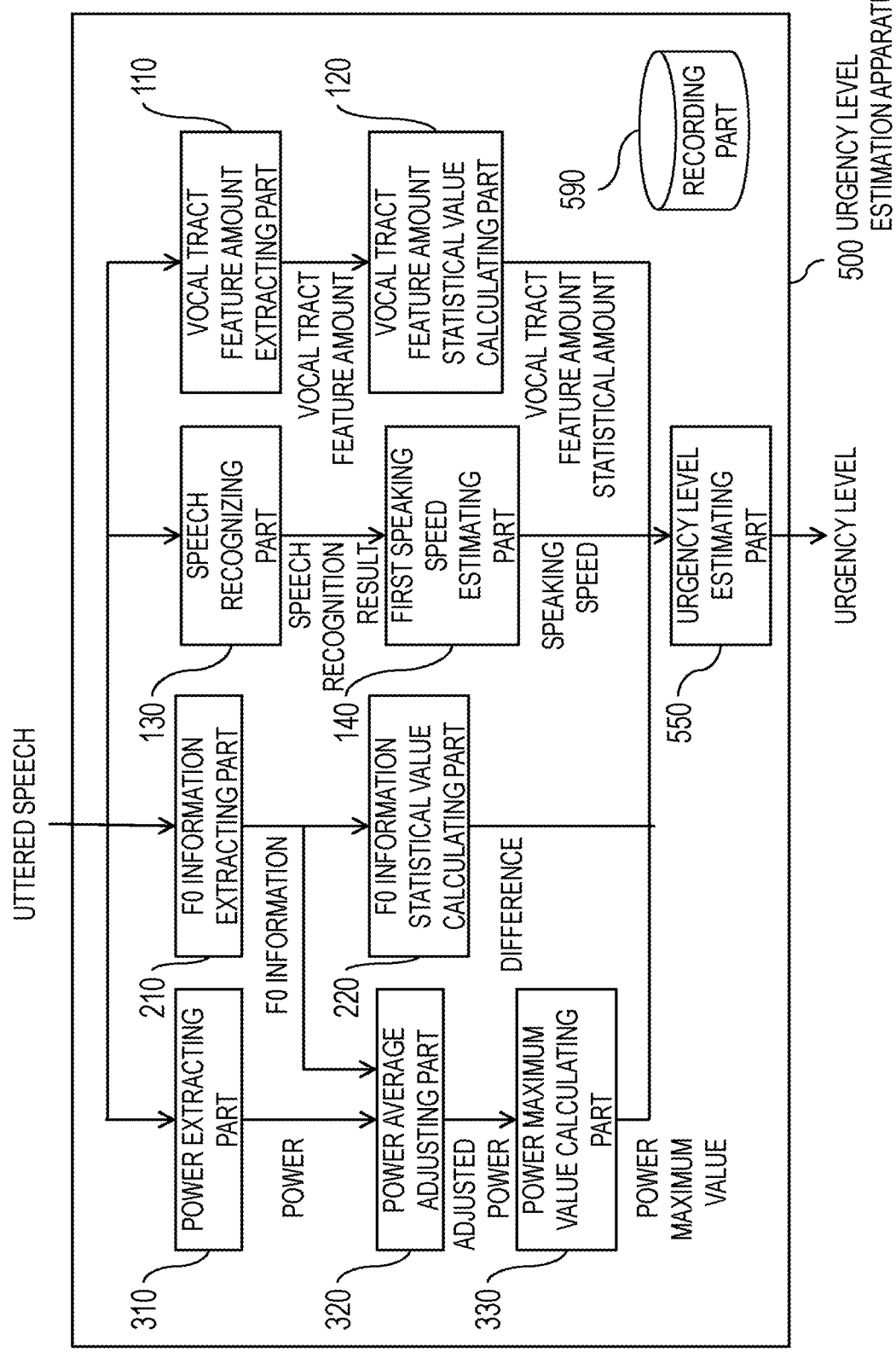
FIG. 16 is a block diagram illustrating an example of a configuration of an urgency level estimation apparatus 500.
Figure 17:
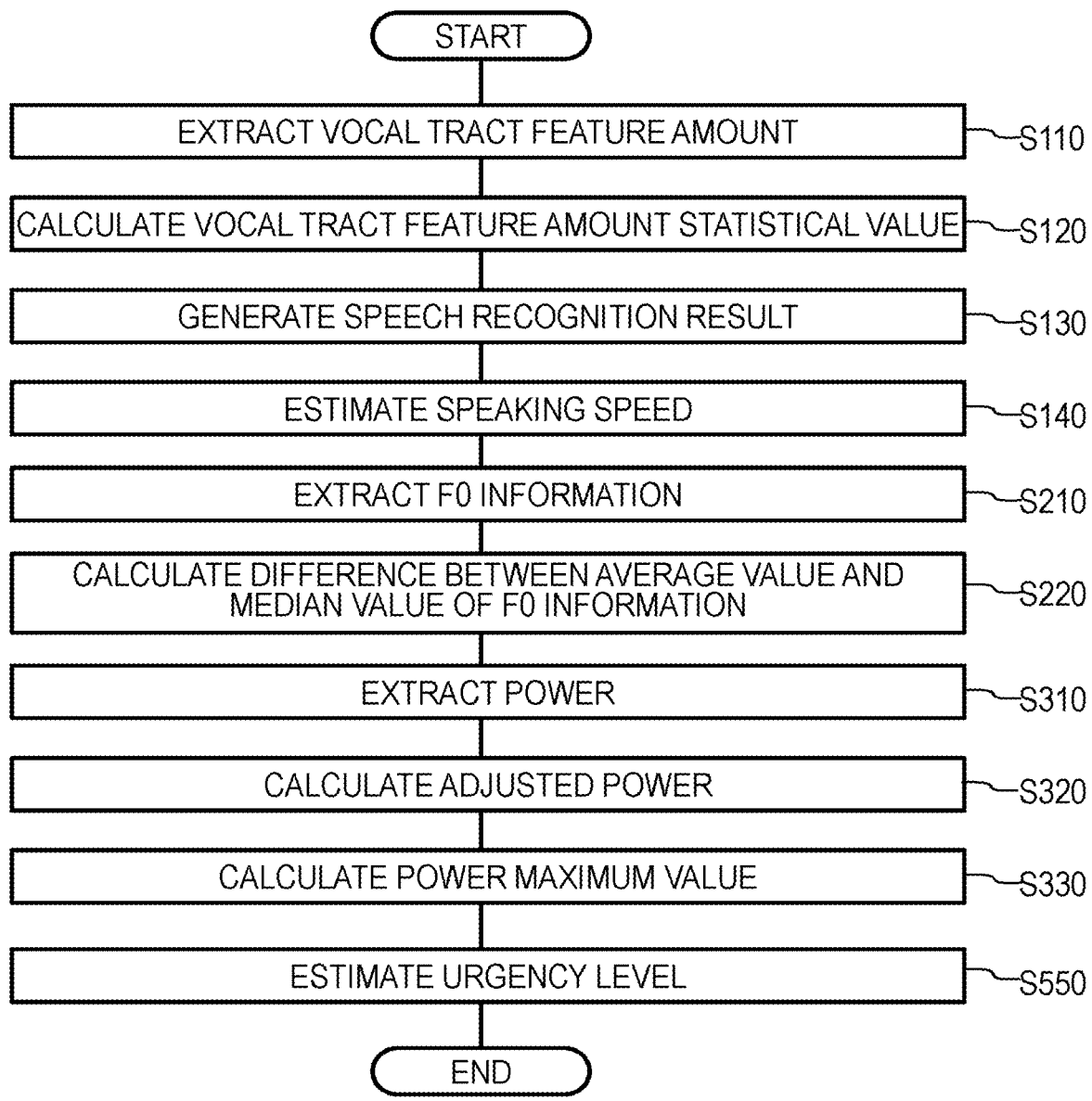
FIG. 17 is a flowchart illustrating an example of operation of the urgency level estimation apparatus 500.

An urgency level estimation apparatus 500 will be described below with reference to FIGS. 16 to 17. FIG. 16 is a block diagram illustrating a configuration of the urgency level estimation apparatus 500. FIG. 17 is a flowchart illustrating operation of the urgency level estimation apparatus 500. As illustrated in FIG. 16, the urgency level estimation apparatus 500 includes the vocal tract feature amount extracting part 110, the vocal tract feature amount statistical value calculating part 120, the speech recognizing part 130, the first speaking speed estimating part 140, the F0 information extracting part 210, the F0 information statistical value calculating part 220, the power extracting part 310, the power average adjusting part 320, the power maximum value calculating part 330, an urgency level estimating part 550, and a recording part 590. The recording part 590 is a component which records information necessary for processing of the urgency level estimation apparatus 500 as appropriate.

The urgency level estimation apparatus 500 reads an urgency level estimation model 580 (not illustrated) and executes processing. It is assumed that the urgency level estimation model 580 is recorded in the recording part 590 in advance.

The urgency level estimation apparatus 500 estimates the urgency level of a speaker of the uttered speech s(t) from the uttered speech s(t) (t=0, 1, 2, . . . , T, t represents a sample number) and outputs the urgency level of a speaker of the uttered speech s(t).

Operation of the urgency level estimation apparatus 500 will be described with reference to FIG. 17. Processing from S110 to S330 is the same as that from the first embodiment to the third embodiment. Therefore, processing in S550 will be described below.

The urgency level estimating part 550 estimates the urgency level of a speaker of the uttered speech s(t) (t=0, 1, 2, . . . , T) from the mean mean(c) and the variance value var(c) calculated in S120, the speaking speed mean(r) estimated in S140, the difference medave(f) calculated in S220 and the power maximum value max(p) calculated in S330 using the urgency level estimation model 580 and outputs the urgency level of a speaker of the uttered speech s(t) (S550). In the urgency level estimation model 580, a mean and a variance value of a vocal tract feature amount of uttered speech, speaking speed of the uttered speech, a difference between an average value and a median value of F0 information of the uttered speech, and a maximum value of adjusted power of the uttered speech are input, and an urgency level of a speaker of the uttered speech is output. A learning method of the urgency level estimation model 580 may be similar to that in the first embodiment.

While, in the urgency level estimation apparatus 500, the speaking speed in the first embodiment is used, the speaking speed in the fourth embodiment may be used instead of the speaking speed in the first embodiment. Here, a configuration where three feature amounts indicating the speaking speed in the fourth embodiment, the voice pitch in the second embodiment, and the strength of the voice in the third embodiment are used will be described.

Figure 18:
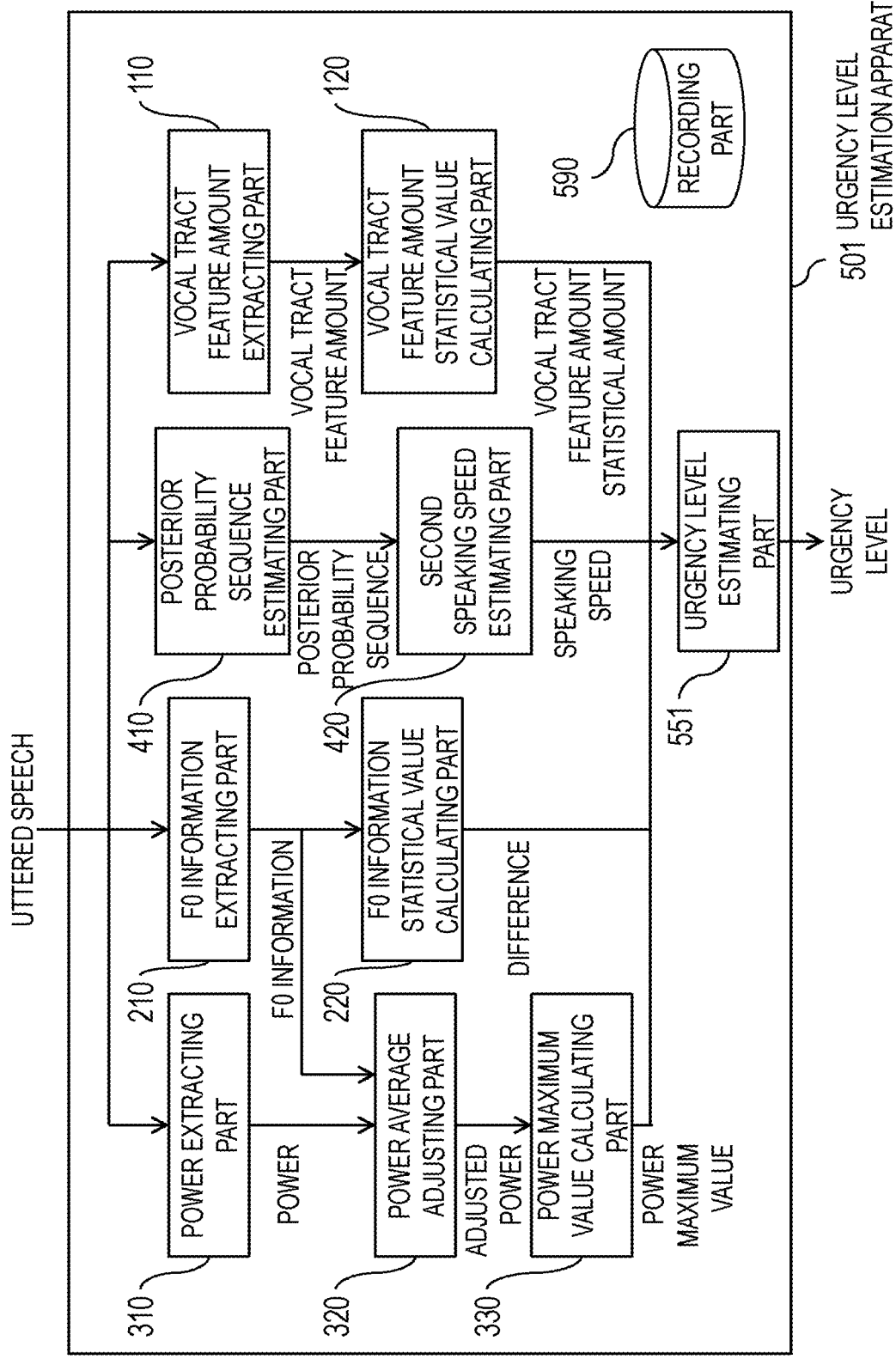
FIG. 18 is a block diagram illustrating an example of a configuration of an urgency level estimation apparatus 501.
Figure 19:
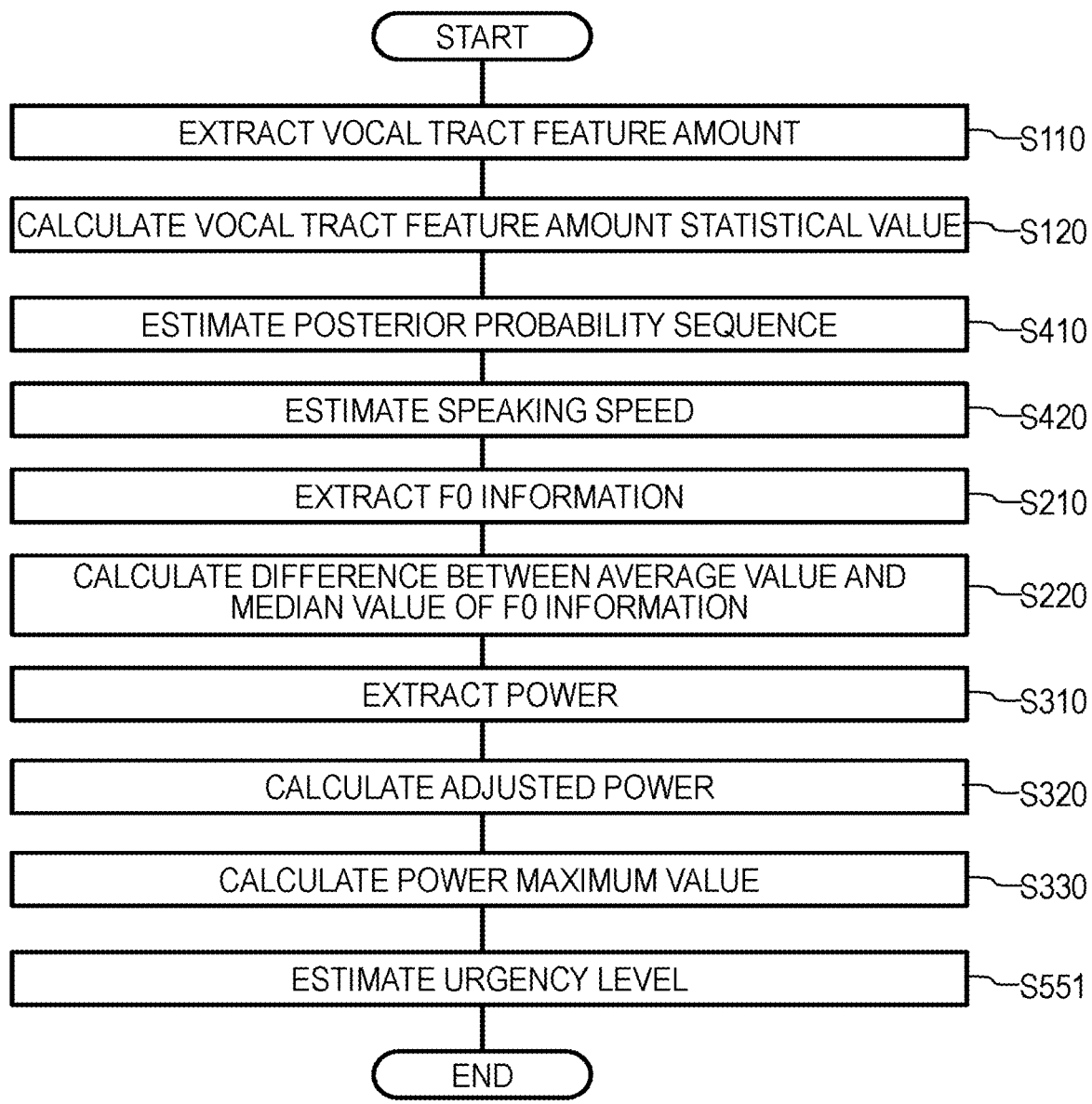
FIG. 19 is a flowchart illustrating an example of operation of the urgency level estimation apparatus 501.

An urgency level estimation apparatus 501 will be described below with reference to FIGS. 18 to 19. FIG. 18 is a block diagram illustrating a configuration of the urgency level estimation apparatus 501. FIG. 19 is a flowchart illustrating operation of the urgency level estimation apparatus 501. As illustrated in FIG. 18, the urgency level estimation apparatus 501 includes the vocal tract feature amount extracting part 110, the vocal tract feature amount statistical value calculating part 120, the posterior probability sequence estimating part 410, the second speaking speed estimating part 420, and the F0 information extracting part 210, the F0 information statistical value calculating part 220, the power extracting part 310, the power average adjusting part 320, the power maximum value calculating part 330, an urgency level estimating part 551, and a recording part 590. The recording part 590 is a component which records information necessary for processing of the urgency level estimation apparatus 501 as appropriate.

The urgency level estimation apparatus 501 reads an urgency level estimation model 581 (not illustrated), a speech recognition acoustic model 482 (not illustrated), and a speaking speed estimation model 484 (not illustrated), and executes processing. It is assumed that the urgency level estimation model 581, the speech recognition acoustic model 482, and the speaking speed estimation model 484 are recorded in the recording part 590 in advance.

The urgency level estimation apparatus 501 estimates the urgency level of a speaker of the uttered speech s(t) from the uttered speech s(t) (t=0, 1, 2, . . . , T, t represents a sample number), and outputs the urgency level of a speaker of the uttered speech s(t).

Operation of the urgency level estimation apparatus 501 will be described with reference to FIG. 19. Processing from S110 to S330 is the same as that from the second embodiment to the fourth embodiment. Thus, processing in S551 will be described below.

The urgency level estimating part 551 estimates the urgency level of a speaker of the uttered speech s(t) (t=0, 1, 2, . . . , T) from the mean mean(c) and the variance value var(c) calculated in S120, the speaking speed mean(r2) estimated in S420, the difference medave(f) calculated in S220, and the power maximum value max(p) calculated in S330 using the urgency level estimation model 581, and outputs the urgency level of a speaker of the uttered speech s(t) (S551). In the urgency level estimation model 581, a mean and a variance value of a vocal tract feature amount of uttered speech, speaking speed of the uttered speech, a difference between an average value and a median value of F0 information of the uttered speech, and a maximum value of adjusted power of the uttered speech are input, and an urgency level of a speaker of the uttered speech speaker is output. A learning method of the urgency level estimation model 581 may be similar to that in the first embodiment.

While, in the urgency level estimation apparatus 500 and the urgency level estimation apparatus 501, in addition to the vocal tract feature amount statistical value, the urgency level is estimated using all three feature amounts indicating the speaking speed, the voice pitch, and the strength of the voice, it is not always necessary to use all of the three feature amounts. The urgency level may be estimated using two feature amounts among the three feature amounts. In this case, it is only necessary that the urgency level estimation apparatus includes components required for calculating the feature amount to be used for estimation, an urgency level estimating part, and a recording part among the components included in the urgency level estimation apparatus 500 and the urgency level estimation apparatus 501.

Figure 20:
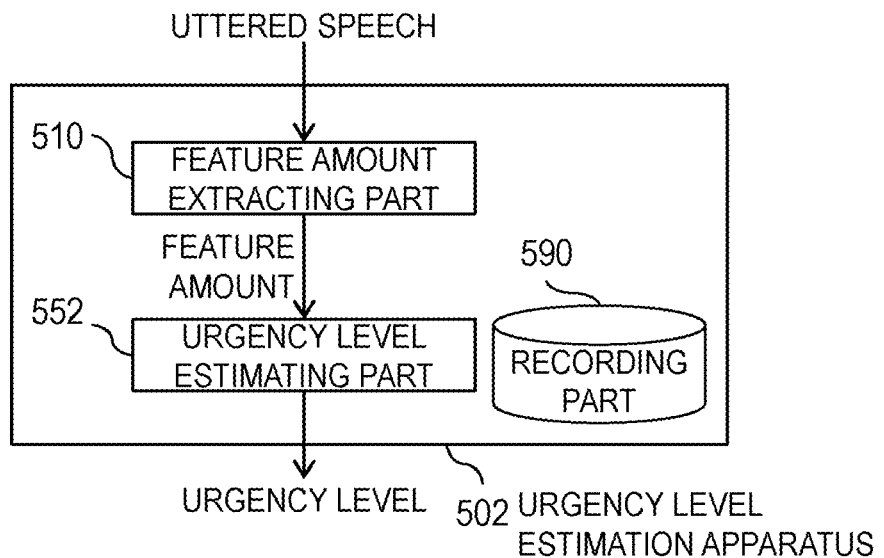
FIG. 20 is a block diagram illustrating an example of a configuration of an urgency level estimation apparatus 502.
Figure 21:
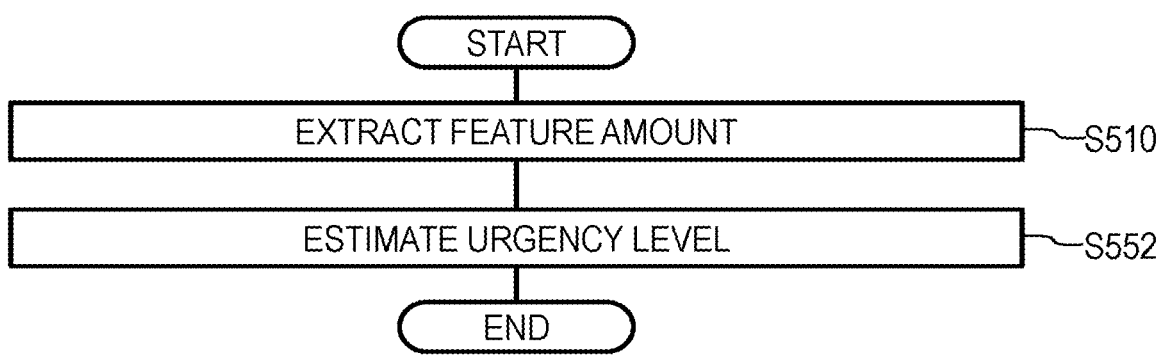
FIG. 21 is a flowchart illustrating an example of operation of the urgency level estimation apparatus 502.

An urgency level estimation apparatus 502 which is an example of such a configuration will be described below with reference to FIGS. 20 to 21. FIG. 20 is a block diagram illustrating a configuration of the urgency level estimation apparatus 502. FIG. 21 is a flowchart illustrating operation of the urgency level estimation apparatus 502. As illustrated in FIG. 20, the urgency level estimation apparatus 502 includes a feature amount extracting part 510, an urgency level estimating part 552, and a recording part 590. The recording part 590 is a component which records information necessary for processing of the urgency level estimation apparatus 502 as appropriate.

The urgency level estimation apparatus 502 estimates the urgency level of a speaker of the uttered speech s(t) from the uttered speech s(t) (t=0, 1, 2, ..., T, t represents a sample number), and outputs the urgency level of a speaker of the uttered speech s(t).

Operation of the urgency level estimation apparatus 502 will be described with reference to FIG. 21. The feature amount extracting part 510 receives the uttered speech s(t) (t=0, 1, 2, ..., T) as input, and extracts and outputs the feature amount of the uttered speech s(t) (S510). Here, the feature amount includes at least one of a feature indicating the speaking speed of the uttered speech, a feature indicating the voice pitch of the uttered speech, and a feature indicating the power level of the uttered speech. The feature indicating the speaking speed of the uttered speech is, for example, the speaking speed in the first embodiment or the speaking speed in the fourth embodiment, the feature indicating the voice pitch of the uttered speech is, for example, the voice pitch in the second embodiment, and the feature indicating the power level of the uttered speech is, for example, the strength of the voice (power level) in the third embodiment. In a case where the feature amount includes, for example, the speaking speed in the first embodiment as a feature, the feature amount extracting part 510 preferably includes the speech recognizing part 130 and the first speaking speed estimating part 140, while, in a case where the feature amount includes the strength of the voice in the third embodiment, the feature amount extracting part 510 preferably includes the F0 information extracting part 210, the power extracting part 310, the power average adjusting part 320, and the power maximum value calculating part 330.

The urgency level estimating part 552 estimates the urgency level of a speaker of the uttered speech s(t) (t=0, 1, 2, ..., T) from the feature amount extracted in S510 based on a relationship between a feature amount extracted from uttered speech and an urgency level of a speaker of the uttered speech, the relationship being determined in advance, and outputs the urgency level of a speaker of the uttered speech s(t) (S552). The relationship between a feature amount and an urgency level is given by, for example, an urgency level estimation model in which a feature amount extracted from uttered speech is input, and an urgency level of a speaker of the uttered speech is output. Further, the relationship has the following properties.

(1) In a case where the feature amount includes a feature indicating the speaking speed of the uttered speech, the urgency level is more likely to be estimated as higher in a case where the feature indicating the speaking speed corresponds to faster speaking speed, than in a case where the feature indicating the speaking speed corresponds to slower speaking speed.

(2) In a case where the feature amount includes a feature indicating the voice pitch of the uttered speech, the urgency level is more likely to be estimated as higher in a case where the feature indicating the voice pitch corresponds to higher voice pitch than in a case where the feature indicating the voice pitch corresponds to lower voice pitch.

(3) In a case where the feature amount includes a feature indicating the power level of the uttered speech, the urgency level is more likely to be estimated as higher in a case where the feature indicating the power level corresponds to greater power than in a case where the feature indicating the power level corresponds to smaller power.

According to the present invention, it becomes possible to estimate an urgency level of a speaker for free uttered speech, which does not require a specific word.

[Supplementary Notes]

The apparatus according to the present invention includes, for example, as single hardware entity, an input part to which a keyboard, or the like, can be connected, an output part to which a liquid crystal display, or the like, can be connected, and a communication part to which a communication apparatus (for example, a communication cable) capable of performing communication with outside of the hardware entity can be connected, a central processing unit (CPU, which may include a cache memory, a register, or the like), a RAM or ROM which is a memory, an external storage apparatus which is a hard disk, and a bus which connects the input part, the output part, the communication part, the CPU, the RAM, the ROM, and the external storage apparatus so as to be enable exchange of data. Further, as necessary, the hardware entity may be provided with an apparatus (drive) which can perform read and write in and from a recording medium such as a CD-ROM. Physical entity having such hardware resources includes a general-purpose computer, or the like.

In the external storage apparatus of the hardware entity, programs necessary for realizing the above functions and data necessary for processing of the programs are stored (not limited to the external storage apparatus, and, for example, the programs may be stored in a ROM which is a read-only storage apparatus). Further, data, or the like, obtained through the processing of these programs is stored in a RAM or an external storage apparatus as appropriate.

In the hardware entity, each program stored in the external storage apparatus (or the ROM, or the like) and data necessary for processing of each program are read into a memory as necessary, and are interpreted/executed by the CPU as appropriate. As a result, the CPU realizes a predetermined function (respective components expressed as the above-described, part, means, or the like).

The present invention is not limited to the above-described embodiments, and can be modified as appropriate without departing from the spirit of the present invention. In addition, the processing described in the above embodiments may be executed not only in time series in accordance with the order of description but also in parallel or individually in accordance with the processing capability of the apparatus which executes the processing or as necessary.

As described above, in a case where the processing functions in the hardware entity (the apparatus of the present invention) described in the above embodiments are realized by a computer, the processing content of the functions that the hardware entity should have is described by a program. Then, by executing this program on a computer, the processing functions of the above hardware entity are realized on the computer.

The program describing this processing content can be recorded on a computer-readable recording medium. As the computer-readable recording medium, for example, any recording medium such as a magnetic recording apparatus, an optical disk, a magneto-optical recording medium, and a semiconductor memory may be used. Specifically, for example, as the magnetic recording apparatus, a hard disk apparatus, a flexible disk, a magnetic tape or the like, can be used, and as the optical disk, a DVD (Digital Versatile Disc), a DVD-RAM (Random Access Memory), a CD-ROM (Compact Disc Read Only) Memory), a CD-R (Recordable)/

RW (ReWritable), or the like, can be used, as the magneto-optical recording medium, an MO (Magneto-Optical disc), or the like, can be used, and, as the semiconductor memory, an EEP-ROM (Electronically Erasable and Programmable-Read Only Memory), or the like, be used.

Further, the program is distributed by, for example, selling, transferring, or lending a portable recording medium such as a DVD or a CD-ROM in which the program is recorded. Still further, a configuration may be employed where the program is distributed by storing the program in a storage apparatus of a server computer and transferring the program from the server computer to other computers via a network.

A computer which executes such a program first stores, for example, the program recorded on a portable recording medium or the program transferred from a server computer in the own storage apparatus once. When executing the processing, the computer reads the program stored in the own storage apparatus and executes the processing in accordance with the read program. Further, as another execution form of this program, the computer may directly read the program from a portable recording medium and execute processing in accordance with the program, or, further, may sequentially execute the processing in accordance with the received program every time the program is transferred from the server computer to the computer. Further, a configuration may be employed where the above-described processing is executed using so-called application service provider (ASP) service which realizes processing functions only through instruction of execution of the program and acquisition of the result without the program being transferred from the server computer to the computer. Note that the program in the present embodiment includes information which is used for processing by an electronic computer and which is equivalent to the program (data, or the like, which is not a direct command to the computer but has property that defines the processing of the computer).

While, in this embodiment, the hardware entity is configured by causing a predetermined program to be executed on a computer, at least a part of these kinds of processing content may be realized by hardware.

The above description of the embodiments of the present invention has been presented for purposes of illustration and description. There is no intention to be exhaustive and there is no intention to limit the invention to the exact disclosed form. Modifications and variations are possible from the above teachings. The embodiments are chosen and expressed in order to provide the best illustration of the principle of the present invention, and to enable those skilled in the art to adapt the present invention in various embodiments so as to be suitable for considered practical use, and make it possible to utilize the present invention while various modifications are made. All such modifications and variations are within the scope of the present invention as defined by the appended claims, which are construed in accordance with the breadth that is provided impartially, legally and fairly.

What is claimed is:

1. An urgency level estimation apparatus comprising:
    processing circuitry configured to
        extract a vocal tract feature amount for each frame obtained by dividing uttered speech, from the uttered speech;
        calculate a mean and a variance value from the vocal tract feature amount as vocal tract feature amount statistical values of the uttered speech;
        generate a set of reading, an utterance start time and an utterance end time for each utterance section included in the uttered speech, from the uttered speech;
        estimate speaking speed of the uttered speech from the set of the reading, the utterance start time and the utterance end time; and
        estimate an urgency level of a speaker of the uttered speech from the mean, the variance value and the speaking speed using an urgency level estimation model learned so that a mean and a variance value of a vocal tract feature amount of uttered speech, and speaking speed of the uttered speech are input, and an urgency level of a speaker of the uttered speech is output.

2. A non-transitory computer-readable recording medium in which a program causes a computer to function as the urgency level estimation apparatus according to claim 1.

3. An urgency level estimation apparatus comprising:
    processing circuitry configured to
        extract a vocal tract feature amount for each frame obtained by dividing uttered speech, from the uttered speech;
        calculate a mean and a variance value from the vocal tract feature amount as vocal tract feature amount statistical values of the uttered speech;
        extract F0 information for each frame obtained by dividing the uttered speech, from the uttered speech;
        calculate a difference between an average value and a median value of the F0 information, from the F0 information; and
        estimate an urgency level of a speaker of the uttered speech from the mean, the variance value and the difference using an urgency level estimation model learned so that a mean and a variance value of a vocal tract feature amount of uttered speech, and a difference between an average value and a median value of F0 information of the uttered speech are input, and an urgency level of a speaker of the uttered speech is output.

4. A non-transitory computer-readable recording medium in which a program causes a computer to function as the urgency level estimation apparatus according to claim 3.

5. An urgency level estimation apparatus comprising:
    processing circuitry configured to
        extract a vocal tract feature amount for each frame obtained by dividing uttered speech, from the uttered speech;
        calculate a mean and a variance value from the vocal tract feature amount as vocal tract feature amount statistical values of the uttered speech;
        extract F0 information for each frame obtained by dividing the uttered speech, from the uttered speech;
        extract power for each frame obtained by dividing the uttered speech, from the uttered speech;
        calculate adjusted power adjusted using power average from the F0 information and the power;
        calculate a power maximum value which is a maximum value of the adjusted power, from the adjusted power; and
        estimate an urgency level of a speaker of the uttered speech from the mean, the variance value and the power maximum value using an urgency level estimation model learned so that a mean and a variance value of a vocal tract feature amount of uttered speech, a maximum value of adjusted power of the uttered speech are input, and an urgency level of a speaker of the uttered speech is output.

6. A non-transitory computer-readable recording medium in which a program causes a computer to function as the urgency level estimation apparatus according to claim 5.

7. An urgency level estimation apparatus comprising:
processing circuitry configured to
extract a vocal tract feature amount for each frame obtained by dividing uttered speech, from the uttered speech;
calculate a mean and a variance value from the vocal tract feature amount as vocal tract feature amount statistical values of the uttered speech;
estimate a posterior probability sequence indicating a probability of sound corresponding to a frame obtained by dividing the uttered speech, the sound being each phoneme, from the uttered speech, using a speech recognition acoustic model for identifying a phoneme from input sound;
estimate speaking speed of the uttered speech from the posterior probability sequence using a speaking speed estimation model learned so that a posterior probability sequence of uttered speech is input, and speaking speed of the uttered speech is output; and
estimate an urgency level of a speaker of the uttered speech from the mean, the variance value and the speaking speed using an urgency level estimation model learned so that a mean and a variance value of a vocal tract feature amount of uttered speech, and speaking speed of the uttered speech are input, and an urgency level of a speaker of the uttered speech is output.

8. A non-transitory computer-readable recording medium in which a program causes a computer to function as the urgency level estimation apparatus according to claim 7.

9. An urgency level estimation method comprising:
a vocal tract feature amount extracting step of an urgency level estimation apparatus extracting a vocal tract feature amount for each frame obtained by dividing uttered speech, from the uttered speech;
a vocal tract feature amount statistical value calculating step of the urgency level estimation apparatus calculating a mean and a variance value from the vocal tract feature amount as vocal tract feature amount statistical values of the uttered speech;
a speech recognizing step of the urgency level estimation apparatus generating a set of reading, an utterance start time and an utterance end time for each utterance section included in the uttered speech, from the uttered speech;
a first speaking speed estimating step of the urgency level estimation apparatus estimating speaking speed of the uttered speech from the set of the reading, the utterance start time and the utterance end time; and
an urgency level estimating step of the urgency level estimation apparatus estimating an urgency level of a speaker of the uttered speech from the mean, the variance value and the speaking speed using an urgency level estimation model learned so that a mean and a variance value of a vocal tract feature amount of uttered speech, and speaking speed of the uttered speech are input, and an urgency level of a speaker of the uttered speech is output.

10. An urgency level estimation method comprising:
a vocal tract feature amount extracting step of an urgency level estimation apparatus extracting a vocal tract feature amount for each frame obtained by dividing uttered speech, from the uttered speech;
a vocal tract feature amount statistical value calculating step of the urgency level estimation apparatus calculating a mean and a variance value from the vocal tract feature amount as vocal tract feature amount statistical values of the uttered speech;
an F0 information extracting step of the urgency level estimation apparatus extracting F0 information for each frame obtained by dividing the uttered speech, from the uttered speech;
an F0 information statistical value calculating step of the urgency level estimation apparatus calculating a difference between an average value and a median value of the F0 information, from the F0 information; and
an urgency level estimating step of the urgency level estimation apparatus estimating an urgency level of a speaker of the uttered speech from the mean, the variance value and the difference using an urgency level estimation model learned so that a mean and a variance value of a vocal tract feature amount of uttered speech, and a difference between an average value and a median value of F0 information of the uttered speech are input, and an urgency level of a speaker of the uttered speech is output.

11. An urgency level estimation method comprising:
a vocal tract feature amount extracting step of an urgency level estimation apparatus extracting a vocal tract feature amount for each frame obtained by dividing uttered speech, from the uttered speech;
a vocal tract feature amount statistical value calculating step of the urgency level estimation apparatus calculating a mean and a variance value from the vocal tract feature amount as vocal tract feature amount statistical values of the uttered speech;
an F0 information extracting step of the urgency level estimation apparatus extracting F0 information for each frame obtained by dividing the uttered speech, from the uttered speech;
a power extracting step of the urgency level estimation apparatus extracting power for each frame obtained by dividing the uttered speech, from the uttered speech;
a power average adjusting step of the urgency level estimation apparatus calculating adjusted power adjusted using power average from the F0 information and the power;
a power maximum value calculating step of the urgency level estimation apparatus calculating a power maximum value which is a maximum value of the adjusted power, from the adjusted power; and
an urgency level estimating step of the urgency level estimation apparatus estimating an urgency level of a speaker of the uttered speech from the mean, the variance value and the power maximum value using an urgency level estimation model learned so that a mean and a variance value of a vocal tract feature amount of uttered speech, a maximum value of adjusted power of the uttered speech are input, and an urgency level of a speaker of the uttered speech is output.

12. An urgency level estimation method comprising:
a vocal tract feature amount extracting step of an urgency level estimation apparatus extracting a vocal tract feature amount for each frame obtained by dividing uttered speech, from the uttered speech;
a vocal tract feature amount statistical value calculating step of the urgency level estimation apparatus calculating a mean and a variance value from the vocal tract feature amount as vocal tract feature amount statistical values of the uttered speech;

a posterior probability sequence estimating step of the urgency level estimation apparatus estimating a posterior probability sequence indicating a probability of sound corresponding to a frame obtained by dividing the uttered speech, the sound being each phoneme, from the uttered speech, using a speech recognition acoustic model for identifying a phoneme from input sound;

a second speaking speed estimating step of the urgency level estimation apparatus estimating speaking speed of the uttered speech from the posterior probability sequence using a speaking speed estimation model learned so that a posterior probability sequence of uttered speech is input, and speaking speed of the uttered speech is output; and an urgency level estimating step of the urgency level estimation apparatus estimating an urgency level of a speaker of the uttered speech from the mean, the variance value and the speaking speed using an urgency level estimation model learned so that a mean and a variance value of a vocal tract feature amount of uttered speech, and speaking speed of the uttered speech are input, and an urgency level of a speaker of the uttered speech is output.

* * * * *